United States Patent
Ko

(10) Patent No.: US 6,220,294 B1
(45) Date of Patent: Apr. 24, 2001

(54) SWITCHING VALVE FOR DOUBLE-HANDLED MIXING FAUCET

(75) Inventor: Hsi-Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 0 days.

(21) Appl. No.: 09/618,041

(22) Filed: Jul. 17, 2000

(51) Int. Cl.⁷ .................................................. F16K 25/00
(52) U.S. Cl. ..................................... 137/625.31; 137/246
(58) Field of Search ................................ 137/246, 625.31

(56) References Cited

U.S. PATENT DOCUMENTS 3,831,621 * 8/1974 Anthony et al. ...................... 137/270
4,651,770 * 3/1987 Denham et al. ...................... 137/270
5,107,884 * 4/1992 Orlandi ............................... 137/454.5

* cited by examiner

*Primary Examiner*—John Fox
(74) *Attorney, Agent, or Firm*—Bacon & Thomas, PLLC

(57) ABSTRACT

An improved switching valve has a valve body, a valve control stem, an upper control valve unit and a lower control valve unit, a seal cap and a locking cap. The valve body and the valve control stem are integrally formed of plastics. The lower control valve unit is provided with oil reservoir cavities and oil grooves so as to permit the upper control valve unit and the lower control valve unit to be lubricantly engaged with each other. The flexible seal cap has tapered flange and a concentrically-ribbed bottom surface so that it can be better sealed in operation. The assembly of the switching valve is simple and speedy and the operation thereof is smooth and durable.

2 Claims, 2 Drawing Sheets

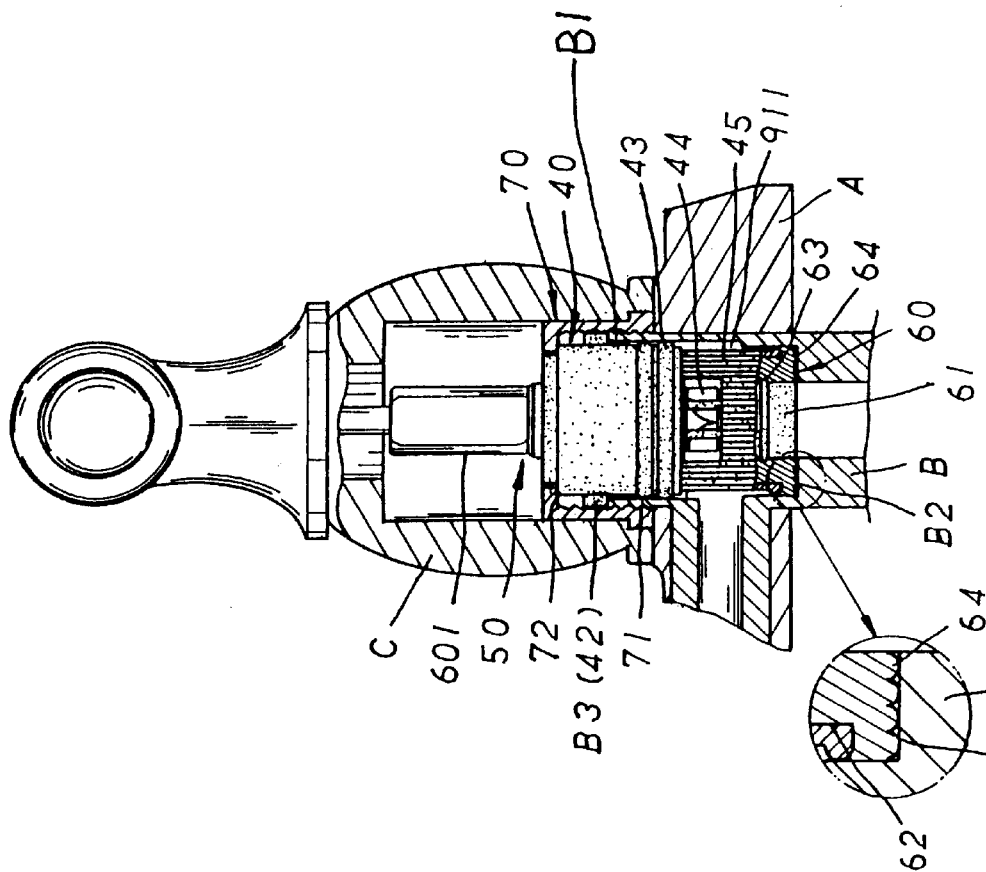
FIG. 3
FIG. 3A
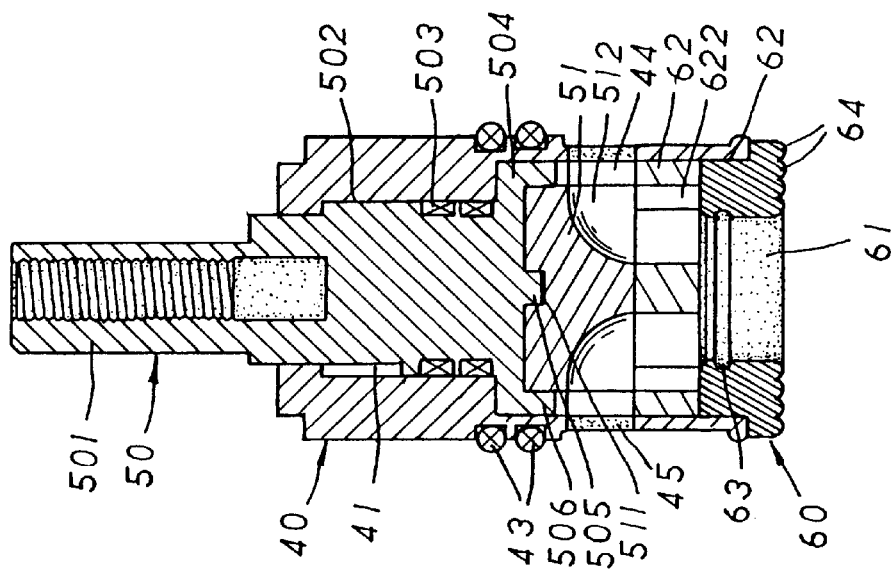
FIG. 2

US 6,220,294 B1

SWITCHING VALVE FOR DOUBLE-HANDLED MIXING FAUCET

BACKGROUND OF THE INVENTION

The present invention relates to an improved switching valve which has a valve body, a valve control stem, an upper control valve unit and a lower control valve unit, a seal cap and a locking cap. The valve body and the valve control stem are integrally formed of plastics. The lower control valve unit is provided with oil reservoir cavities and oil grooves so as to permit the upper control valve unit and the lower control valve unit to be lubricantly engaged with each other in rotation. The flexible seal cap has tapered flange and a concentrically-ribbed bottom surface so that it can be better sealed in operation. The assembly of the switching valve is simple and speedy and the operation thereof is smooth and durable.

It is well known that there are many prior art switching valves sold in markets all over the world. In general, are common the structures of those conventional valves mainly applied to faucets of all kinds. They are all made up of a valve body, a valve control stem, a seal ring, a retaining block, an upper control valve unit and a lower control valve unit, a small seal ring, a large seal ring and a side seal ring. Such prior valves have some disadvantages in practical use given as follows:

1. The valve body and the valve control stem are complicated in structure and must be assembled together piece by piece, resulting in high cost of production and difficulty in practical assembly It becomes difficult to mass produce such valves.
2. The large seal ring is easily deformed under high pressure, so the faucet is easily subject to leakage in use.
3. The retaining blocks are usually made of metal, resulting in a handle of a faucet being difficult to operate.

SUMMARY OF THE INVENTION

Therefore, the primary object of the present invention is to provide an improved switching valve wherein the main control valve body and the valve control stem are integrally made of plastics without further manual processing so that they can be easily assembled with speed and produced at low cost.

Another object of the present invention is to provide an improved switching valve wherein a flexible seal cap is used to better protect the valve from leaking in operation.

One further object of the present invention is to provide an improved switching valve which is provided with a flexible seal cap which permit a handle of a faucet to be operated with readiness and smoothness.

One still further object of the present invention is to provide a switching valve wherein an upper control valve unit and a lower valve unit that are smoothly engaged with each other by way of lubricating oil, permitting the valve to operate in a longer and smoother manner.

BRIEF DESCRIPTION OF THE DRAWINGS

FIG. 2 is a sectional diagram showing the structure of the present invention;

FIG. 3 is a sectional diagram showing the mounting of the present invention to a faucet;

FIG. 3A is an enlarged diagram showing the details of a partial assembly thereof.

DETAILED DESCRIPTION OF THE PREFERRED EMBODIMENTS

Figure 1:
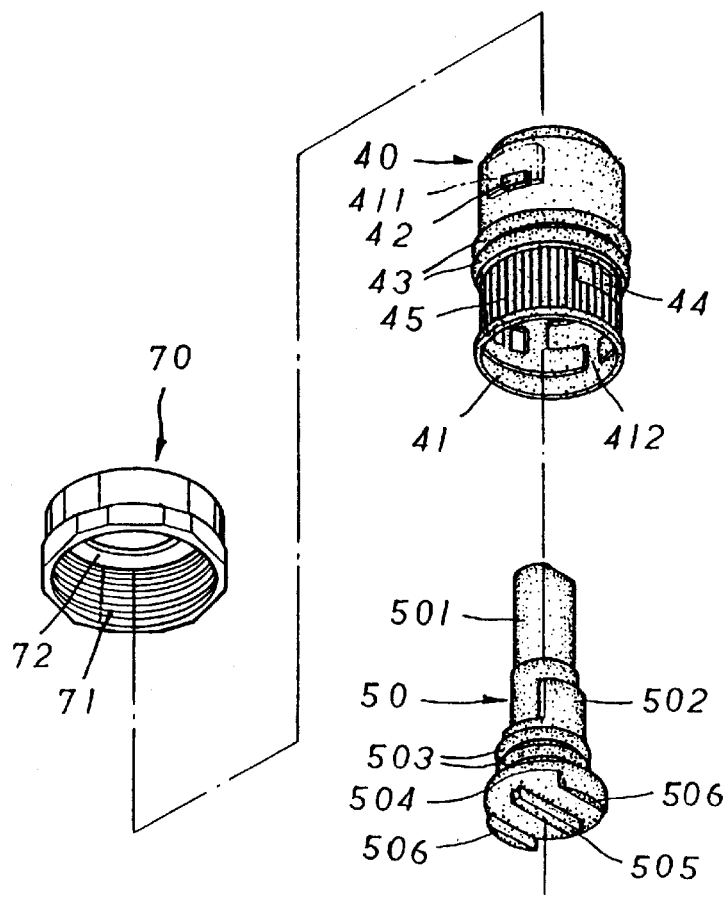
FIG. 1 is a perspective diagram showing the exploded components of the present invention.
Figure 1A:
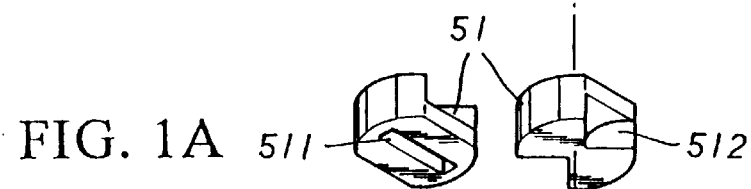
FIG. 1A is a diagram showing a reverse side of the upper control valve unit.
Figure 1B:
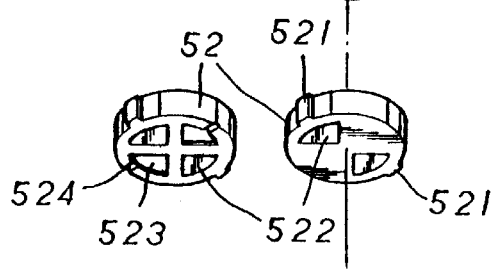
FIG. 1B is a diagram showing a reverse side of the lower control valve unit.
Figure 1C:
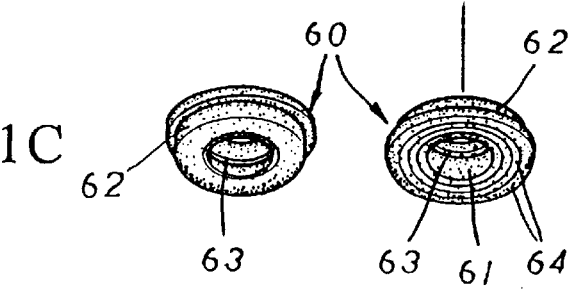
FIG. 1C is a diagram showing a reverse side of the sea cap.

Referring to FIGS. 1, 1A, 1B, 1C, the present invention comprises a switching valve body 40, a valve control stem 50, an upper control valve unit 51, a lower control valve unit 52, a seal cap 60 and a locking cap 70.

The switching valve body 40 integrally formed of plastics is a two-staged cylinder. The upper section has a smaller diameter and shorter length and the lower section has a larger diameter and longer length with a stop shoulder formed therebetween. The lower portion has an open-ended 3-staged valve chamber 41 which is provided with a quarter-circularity extended retaining block 411 and is in communication with a valve stem hole at the top end thereof. The middle stage of the valve chamber is intermediate of its diameter and length. The lower stage has a larger diameter and shorter length and on the external surface thereof are symmetrically disposed a pair of guide blocks 42. A pair of seal rings 43 are disposed on the external surface of the middle of the switching valve body 40. Two water outlet 44 communicating with valve chamber 41 are disposed right under the seal rings 43. A plurality of axially extended reinforcement ribs 45 are peripherally disposed on the external surface of the lower stage of the switching valve body 40. On the internal surface of the valve chamber 41 and adjacent to the bottom end thereof are disposed a pair of symmetric positioning grooves 412.

The valve control stem 50 integrally made of plastics is provided with a connecting section 501, a retaining section 502, a pair of sealing ring sections 503 disposed right under the retaining section 502 and a round bottom having a larger diameter to form a stop flange section 504. At the center of the underside of the stop flange section 504 is disposed a protruded driving rib 505 and a pair of retaining protrusions 506.

The upper control valve unit 51 is a cylindrical block having two parallel flat-cut sides and has a rectangular engagement cavity 511. As shown in FIG. 9A, a quarter-circular water inlet recess 512 extends inwardly toward the center of the upper control valve unit 51 from each flat-cut side.

The lower control valve unit 52 is a round disc having a pair of symmetric retaining protrusions 521 disposed on a peripheral surface thereof A pair of center symmetric quarter-circular water inlet 522 and a pair of center symmetric quarter-circular oil reservoir chambers 523 for accommodation of absorptive and lubricating oil. A groove 524 in communication with each oil reservoir chamber 523 is defined on the peripheral edge so that when the upper control valve unit 51 and the lower control valve unit 52 are rotatably engaged, they will be smoothly and easily moved relatively with each other in operation as a result of reduction of frictional resistance therebetween.

The seal cap 60 having a two-staged circular structure is flexible in nature and provided with a central water inlet hole 61. The seal cap 60 is small of its upper portion and is large of its lower portion and has a tapered periphery 62 defined between the upper and lower portions. At the central water inlet hole 61 is disposed a flexible ring groove 63 and a tapered and outwardly enlarged introduction face. On the underside of the large portion of the seal cap 60 are disposed a plurality of concentric ribs 64.

The locking cap 70 has an internally threaded central through hole 71 with a peripheral shoulder 72 disposed at the top end of the central through hole 71. The diameter of the peripheral shoulder 72 is slightly smaller than the diameter of the switching valve body 40

In assembly, as shown in FIG. 2, the control valve stick 50 is housed in the valve chamber 41 of the switching valve body 40 with the connection section 501 stuck out of a stem hole disposed at the top of the switching valve body 40. The semi-circular retaining section 502 just dodges the quarter circularity expanded retaining block 41 1 and engages with the tri-quarter circularity expanded space and can only move in 90 degrees. The engagement cavity 511 of the upper control valve unit 51 is registered with the protruded driving rib 505 of the valve control stem 50 and the two retaining protrusions 506 are in abutment against the two parallel flat-cut sides of the upper control valve unit 51. The lower control valve unit 52 is smoothly guided into the switching valve body 40 with the symmetric retaining protrusions 521 registered with the positioning grooves 412 of the valve body 40; at the same time, the side with the oil reservoir chambers 523 and the grooves 524 of the lower control valve unit 52 faces the valve chamber 41 is in lubricating contact with the bottom side of the upper control valve unit 51. Then the tapered flange 62 of the small diameter section of the seal cap 60 is stuffed into the valve chamber 41 of the switching valve body 40 to complete the assembly.

Referring to FIGS. 3, 3A, when the control valve is to be housed in a faucet, the handle base A is registered with the a faucet body B, and then the assembled switching valve body is directly housed in a chamber B1 of the faucet body B with the guide block 42 of the switching valve body 40 registered with a cut B3 on each two symmetric sides of the chamber B1 of the faucet body B. Afterwards, the internal threads 71 of the locking cap 70 permit the cap 70 to be secured to the externally threaded chamber B1 of the faucet body B, allowing the peripheral shoulder 72 of the locking cap 70 to abut against the assembled switching valve body so as to force the same in the chamber B1 of the faucet body B. At the moment, the flexible seal cap 60 is compressed to make the tapered periphery 62 inwardly contracted and the concentrically-ribbed bottom 64 to be outwardly expanded. Thereby it can be fixed in abutment against the stop shoulder B2 of the faucet body B. At last, an operational handle C is mounted onto the top end of the faucet body B so that the rotation of the handle C results in the opening and closing of the water inlet recess 512 of the upper control valve unit 51 to regulate the output and cut of water supply. When the upper control valve unit 51 is put in an opening status, water will flow from a water pipe into the water inlet hole 61 of the seal cap 60 and is led smoothly to the water inlet 522 of the lower control valve unit 52 and further to the water inlet recess 512 of the upper control valve unit 51. Finally, water will flow out of the water inlet recess 512 and further out of the water outlets 44 of the switching valve body 40 and flow to a water outlet pipe to supply water. In case the upper valve control unit 51 is put in a closed status, the flow in the water inlet recess 512 is stopped, resulting in cutting of water supply in the pipe.

In summary, the present invention has the following advantages:

1. The switching control valve 40 and valve control stem 50 are integrally produced of plastics, so they are made in low cost and installed with readiness.

2. The flexible seal cap 60 is more resilient so that it can be firmly and closely engaged with the abutment flange B2 of the faucet body B without bending into deformation under high pressure, producing effective seal purpose.

3. The seal cap 60 permits the rotatable control mount C to operate smoother and with less effort.

4. The upper control valve unit 51 and the lower control valve unit 52 are lubricantly bound together, so the operational life and readiness are advanced.

I claim:

1. A switching valve for use in a faucet, comprising a switching valve body, a valve control stem, an upper control valve unit, a lower control valve unit, a seal cap and a locking cap;

said valve control stem being removably engaged with said upper control valve unit;

said upper control valve unit being placed relatively rotatable against said lower control valve unit;

said lower control valve unit being secured to an interior of said switching valve body;

said valve control stem, said upper control valve unit, said lower control valve unit being housed in sequence in said switching valve body;

said flexible seal cap having a central water inlet hole being engaged with a bottom end of said switching valve body;

said locking cap having a central internally threaded hole having a diameter slightly smaller than a diameter defined by a pair of external guide blocks on an external wall of said switching valve body;

said valve control stem being led through said central hole of said locking cap so that said valve assembly can be secured in place in a faucet mount;

wherein said switching valve body integrally formed of plastics is a two-staged cylinder; a lower portion of said switching valve body has an open-ended 3-staged valve chamber which is provided with a quarter-circularity extended retaining block and is in communication with a valve stem hole at the top end thereof;

said upper control valve unit is a cylindrical block having two parallel flat-cut sides and has a rectangular engagement cavity, a quarter-circular water inlet recess extends inwardly toward the center of said upper control valve unit from each flat-cut side;

said valve control stem integrally made of plastics is provided with a connecting section, a retaining section, a pair of sealing ring sections disposed right under the retaining section and a round bottom having a larger diameter to form a stop flange section; at the center of the underside of said stop flange section is disposed a protruded driving rib and a pair of retaining protrusions;

a middle stage of said valve chamber is intermediate of its diameter and length; a lower stage thereof has a larger diameter and shorter length and on an external surface thereof are symmetrically disposed a pair of guide blocks; a pair of seal rings are disposed on an external surface at the middle of said switching valve body; two water outlet communicating with said valve chamber are disposed right under said seal rings; a plurality of axially extended reinforcement ribs are peripherally disposed on the external surface of the lower stage of the switching valve body; on the internal surface of the valve chamber and adjacent to the bottom end thereof are disposed a pair of symmetric positioning grooves;

said seal cap having a two-staged circular structure is flexible in nature and provided with a central water inlet hole; said seal cap is small of its upper portion and is large of its lower portion and has a tapered periphery defined between said upper and lower portions; at the central water inlet hole is disposed a flexible ring groove and a tapered and outwardly enlarged introduction face; on the underside of the large portion of said seal cap are disposed a plurality of concentric ribs;

said locking cap has an internally threaded central through hole with a peripheral shoulder disposed at the top end of the central through hole; the diameter of said peripheral shoulder is slightly smaller than the diameter of said switching valve body.

2. The switching valve for use in a faucet as claimed in claim 1 wherein said lower control valve unit is a round disc having a pair of symmetric retaining protrusions disposed on a peripheral surface thereof; a pair of center-symmetric quarter-circular water inlet and a pair of center-symmetric quarter-circular oil reservoir cavities for accommodation of lubricating oil; a groove in communication with each said oil reservoir cavity is defined on a peripheral edge so that when said upper control valve unit and said lower control valve unit are rotatably engaged, they will be smoothly and easily moved relatively with each other in operation as a result of reduction of frictional resistance therebetween.

\* \* \* \* \*